Patented Mar. 17, 1953

2,631,935

UNITED STATES PATENT OFFICE 2,631,935

HERBICIDAL COMPOSITIONS CONTAINING ESTERS OF THIOLACETIC ACID

Luther L. Baumgartner, Hastings on Hudson, N. Y., assignor to The B. F. Goodrich Company, New York, N. Y., a corporation of New York No Drawing. Application March 4, 1950, Serial No. 147,753

13 Claims. (Cl. 71—2.3)

This invention relates to herbicidal composition and more specifically pertains to herbicidal compositions which contain as an essential active ingredient an ester of thiolacetic acid with a monohydric phenol.

I have discovered that esters of thiolacetic acid with phenols, especially unsubstituted phenols, alkylated phenols and halogen-substituted phenols, possess rapid herbicidal activity and are quite useful in the preparation of a variety of herbicidal compositions. Compositions containing such esters in concentrations from 0.1 to 1% by weight possess selective herbicidal activity in that they are effective in killing the broad-leaved weeds and undesirable grasses commonly found in lawns, pastures, golf greens, etc., without permanently injuring the desirable grasses or clover. However, when the active ingredient is used at higher concentrations, up to 10% by weight and especially at concentrations of from 3% to 10% by weight, such compositions kill nearly all plant life in an active state of growth and are consequently useful in applications where it is desirable to eliminate all plant growth or foliage from a given area.

The active ingredients which are preferred for the preparation of the herbicidal compositions of this invention are the esters of thiolacetic acid with simple phenols, alkylated phenols and nuclear-halogenated phenols. Such esters have the general formula

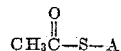

where A is an aryl hydrocarbon group or a haloaryl group such as those containing from 1 to 5 halogen atoms, preferably chlorine atoms, attached to nuclear carbon atoms, and may be prepared by esterifying thiolacetic acid with the appropriate phenol in the conventional manner or by other methods. However, other phenol esters of thiolacetic acid including the esters derived from nitro-substituted phenols, alkoxy-substituted phenols and various other monofunctional monohydric phenols may also be used as the active ingredients of this invention.

Typical specific compounds of the preferred class of active ingredients are, for example, phenyl thiolacetate, alpha-naphthyl thiolacetate, beta-naphthyl thiolacetate, biphenyl thiolacetate, o-, m- and p-tolyl thiolacetates, 2,3-dimethylphenyl thiolacetate, 2,4- dimethylphenyl thiolacetate, 2,5-dimethylphenyl thiolacetate, 2,3,4-trimethylphenyl thiolacetate, 3,4,5 - trimethylphenyl thiolacetate, 2,4,6-trimethylphenyl thiolacetate, 2,3,5-trimethylphenyl thiolacetate, o-, m- and p-ethylphenyl thiolacetates, 2-ethyl-3-methylphenyl thiolacetate, 2 - ethyl-4-methylphenyl thiolacetate, 2-ethyl - 5 - methylphenyl thiolacetate, o-, m- and p-isopropylphenyl thiolacetates, mono-, di- and tri-phenethylphenyl thiolactates, tetra-methylphenyl thiolacetates, penta-methylphenyl thiolacetate, the various mono-, di-, tri-, tetra- and penta-chlorophenyl thiolacetates, the corresponding bromine compounds, etc.

In the herbicidal compositions of this invention the active ingredient is uniformly incorporated in an inert diluent or carrier. The nature of the carrier may be varied widely, so that the compositions are in the form of solutions, aqueous dispersions or dusts. The solutions can be prepared by dissolving a sufficient amount of the active ingredient in a suitable solvent to give the desired concentration. I have found that such hydrocarbons as kerosene, light paraffin oils and other similar petroleum fractions are the most suitable solvents.

Aqueous dispersions of two types can be prepared. The first type is one in which no dispersing or wetting agent is used. Such a dispersion is prepared by dissolving the active ingredient in the smallest quantity of solvent such as alcohol, acetone, benzene, kerosene and the like, in which the active ingredient will dissolve and then dispersing the solution in water. Where the solvent is miscible with water, the solution is merely added to enough water to give the desired concentration. Where the solvent is immiscible, a dispersion is made by dispersing the solution in water with a colloid mill or a homogenizer. The second type of aqueous dispersion is prepared with the aid of a wetting or dispersing agent. Such a dispersion is prepared by dispersing the active ingredient per se or a solution thereof in an organic solvent, in an aqueous solution of a dispersing or wetting agent.

Dust compositions are prepared by thoroughly mixing together the active ingredient and a finely-divided pulverulent solid material such as talc, clays, diatomaceous earths, calcium carbonate, and the like. The mixing can be carried out by such means as a ball mill, but any other means may be employed so long as the resulting dust composition has the active ingredient uniformly dispersed throughout the entire mass of the inert pulverulent solid. These dusts can also contain a surface active agent to enhance their herbicidal activity and render them more easily wettable.

The surface active agents used in dust compositions and the dispersing or wetting agents used in aqueous compositions are generally of the same types and can both be illustrated by the following general classifications: sodium and potassium salts of fatty acids known as soft and hard soaps; salts of disproportionated abietic acid known as rosin soaps; salts of the hydroxyaldehyde acids present in seaweed known as algin soaps; alkali-casein compositions; water-soluble lignin sulfonate salts; long chain alcohols usually containing 10 to 18 carbon atoms; water-soluble salts of sulfated fatty alcohols containing 10 to 18 carbon atoms; water-soluble salts of sulfated fatty acid amides; water-soluble esters of sulfated fatty acids; water-soluble alkyl sulfonates having on the average of 16 carbon atoms in the alkyl group; water-soluble aryl sulfonates; water-soluble alkyl aryl sulfonates; water-soluble aralkyl sulfonates; water-soluble sorbitan monolaurate, -palmitate, -stearate, and -oleate; quaternary ammonium alkyl halides; fatty acid saponified with amines and amino alcohols; and others. These materials are sold under numerous trade names either as pure compounds or mixtures of compounds of the same class and mixtures of these compounds with fillers or diluents.

When the above dispersing or wetting agents are employed to prepare herbicidal compositions containing an ester of thiolacetic acid as the active ingredient, it will ordinarily be necessary to use in the compositions only from about 0.1% to about 5% by weight thereof, depending on the efficiency of the specific dispersing or wetting agent.

The following examples, in which specific compositions and methods of using them are set forth to demonstrate the herbicidal activity of thiolacetic acid esters, are illustrative of the invention but, as will be understood, the invention is not confined thereto.

Example I

A solution containing 0.5% by weight of 4-chlorophenyl thiolacetate dissolved in a solvent mixture containing 10% by weight of acetone and 90% by weight of insecticide grade of kerosene was prepared. This solution was sprayed on young tomato plants and young bean plants growing in flats in a greenhouse. Other tomato and bean plants of the same age were sprayed with a composition containing the recommended concentration of 2,4-dichlorophenoxy acetic acid, the commercial weed killer known as 2,4D. The plants sprayed with the ester of thiolacetic acid were dead three days after spraying while those sprayed with 2,4D did not die until about 15 days later, thus demonstrating the rapid herbicidal activity of the compounds of this invention.

Example II

A plot of mature blue grass lawn 100 square feet in area in which also was growing clover, crab grass and a variety of broad-leaved annuals including lambquarters, milkweed, galinsoga, dandelion and portulaca, was sprayed with a composition containing 1% by weight of beta-naphthyl thiolacetate dissolved in a solvent containing 10% by weight of acetone and 90% by weight of insecticide grade of kerosene. Within five days after spraying all the broadleaved annuals were dead and the crab grass was dead. The blue grass and the clover, although temporarily injured, had recovered their normal healthy state of growth within a few weeks after treatment.

Example III

A plot of mature blue grass lawn 100 square feet in area containing lawn grasses, clover, crab grass and the broad-leaved annuals mentioned in Example II, was sprayed with a solution containing 0.5% by weight of 4-chlorophenyl thiolacetate dissolved in insecticide grade kerosene. Within five days after spraying, the crab grass and the broad-leaved annuals were dead. Although the blue grass and clover showed some signs of temporary injury, the lawn was in healthy condition, free from crab grass and weeds, within a month after treatment.

Examples IV to VII

Example III was four times duplicated except for using in place of 4-chlorophenyl thiolacetate, the following thiolacetates respectively: (1) 2 5-dichlorophenyl thiolacetate, (2) a mixture of the various isomers of S-(trichlorophenyl) thiolacetate, (3) phenyl thiolacetate and (4) p-tolyl thiolacetate. In each case the results were substantially equivalent to those of Example III, the crab grass and the broad-leaved annuals being killed in a period of five days.

Example VIII

The above examples were duplicated using aqueous dispersions and dusts containing the same esters of thiolacetic acid in place of solutions thereof. It was found that aqueous dispersions and dusts containing 0.25% to 1% by weight of sodium lauryl sulfate in addition to 0.5% to 1% of the active ingredient gave a good kill of the crab grass as well as the broad-leaved annuals in about seven days.

Example IX

An oil-in-water emulsion containing 3 parts of pentachlorophenyl thiolacetate as active ingredient in a carrier consisting of 20 parts of kerosene, 80 parts of water and 1.0 part of a wetting and emulsifying agent of the fatty polyether type known commercially as "Igepol 300," was sprayed at the rate of 5.0 lbs. of active ingredient per acre on a plot of growing mixed weeds and grasses. Within a week after spraying substantially all of the plants in the plot were dead.

The above Examples II to VIII demonstrated that the compositions of this invention containing 0.1% to about 0.5% by weight of thiolacetic acid ester are good selective herbicides, being effective against broad-leaved annuals and crab grass but not permanently injuring lawn grasses or clover. Example IX shows that compositions containing higher concentrations of the active ingredients, 2% to 10% by weight, kill substantially all forms of growing plant life and accordingly are of considerable use in eradicating the weed growth in railroad right-of-ways, in highway berms, in non-paved driveways, in tennis courts, in unpaved aircraft landing strips, playgrounds, and the like.

The examples also demonstrate that the herbicides of this invention are rapid in their activity, killing plants in as little as 2 to 8 days. This is especially noteworthy since such commercial weed killers as 2,4-dichlorophenoxy acetic acid and its esters and salts are not nearly so rapid in their activity. The esters and salts of 2,4-dichlorophenoxy acetic acid used in the recommended concentrations will cause the death of such broad-leaved annuals as lambquarters, milkweed, galinsoga, dandelion, and portulaca in about 14 days while the recommended concentrations of the acid will take about 20 days to kill the same plants.

While I have illustrated this invention by way of specific compositions and specific uses of these compositions, I do not desire or intend to limit myself solely thereto for as hitherto stated the precise proportions of the active ingredients can be varied and equivalent chemical compounds may be substituted, if desired, without departing from the spirit and scope of the invention as defined in the appended claims.

I claim:

1. The method of killing plant life which comprises uniformly depositing on the plants a lethal quantity of an ester of thiolacetic acid with a monohydric phenol.

2. The method of killing plant life which comprises uniformly depositing on the plants a lethal quantity of composition containing 0.1% to 10% by weight of phenyl thiolacetate.

3. The method of killing plant life which comprises uniformly depositing on the plants a lethal quantity of a composition containing 0.1% to 10% by weight of a chlorophenyl thiolacetate.

4. The method of selectively killing weed plants in an area containing crop plants which comprises uniformly depositing on the area a lethal quantity of a composition containing 0.1% to 1.0% by weight of a chlorophenyl thiolacetate.

5. A herbicidal composition comprising from 0.1 to 10% by weight of an ester of thiolacetic acid with a monohydric phenol, as an essential active ingredient, and an aqueous solution of dispersing agent as a carrier therefor.

6. A herbicidal composition comprising from 0.1 to 10% by weight of an ester of thiolacetic acid with a monohydric phenol, as an essential active ingredient, and a pulverulent solid as a carrier therefor.

7. A herbicidal composition comprising from 0.1 to 10% by weight of an ester of thiolacetic acid with a monohydric phenol, as an essential active ingredient, and a liquid hydrocarbon oil as a carrier therefor.

8. A herbicidal composition comprising from 0.1 to 10% by weight of phenyl thiolacetate, as an essential active ingredient, and an aqueous solution of dispersing agent as a carrier therefor.

9. A herbicidal composition comprising from 0.1 to 10% by weight of phenyl thiolacetate, as an essential active ingredient, and a pulverulent solid as a carrier therefor.

10. A herbicidal composition comprising from 0.1 to 10% by weight of phenyl thiolacetate, as an essential active ingredient, and a liquid hydrocarbon oil as a carrier therefor.

11. A herbicidal composition comprising from 0.1 to 10% by weight of a chlorophenyl thiolacetate, as an essential active ingredient, and an aqueous solution of dispersing agent as a carrier therefor.

12. A herbicidal composition comprising from 0.1 to 10% by weight of a chlorophenyl thiolacetate, as an essential active ingredient, and a pulverulent solid as a carrier therefor.

13. A herbicidal composition comprising from 0.1 to 10% by weight of a chlorophenyl thiolacetate, as an essential active ingredient, and a liquid hydrocarbon oil as a carrier therefor.

LUTHER L. BAUMGARTNER.

REFERENCES CITED

The following references are of record in the file of this patent:

Beilstein's Handbuch Der Organischen Chemie, 4th ed., vol. VI, page 310 (1923).

Beilstein's Handbuch Der Organischen Chemie, 4th ed., vol. VI, pages 326 and 327.

Chemical Abstracts, volume 3 (1909), col. 1025.